US010175137B2

(12) United States Patent
Spanevello

(10) Patent No.: US 10,175,137 B2
(45) Date of Patent: Jan. 8, 2019

(54) PRESSURE MEASUREMENT DEVICE AND BRAKING SYSTEM COMPRISING SUCH PRESSURE MEASUREMENT DEVICE

(71) Applicant: AKWEL SA, Champfromier (FR)

(72) Inventor: Marco Martino Spanevello, Venasque (FR)

(73) Assignee: AKWEL SA, Champfromier (FR)

( * ) Notice: Subject to any disclaimer, the term of this patent is extended or adjusted under 35 U.S.C. 154(b) by 273 days.

(21) Appl. No.: 14/974,109

(22) Filed: Dec. 18, 2015

(65) Prior Publication Data

US 2016/0178474 A1 Jun. 23, 2016

(30) Foreign Application Priority Data

Dec. 18, 2014 (FR) ...................................... 14 62777

(51) Int. Cl.
*G01M 3/26* (2006.01)
*F16K 15/14* (2006.01)
*G01L 19/00* (2006.01)
*B60T 17/04* (2006.01)
*F16K 31/00* (2006.01)

(52) U.S. Cl.
CPC ............. *G01M 3/26* (2013.01); *B60T 17/043* (2013.01); *F16K 15/148* (2013.01); *F16K 31/005* (2013.01); *G01L 19/0015* (2013.01)

(58) Field of Classification Search
CPC ....................................................... G01M 3/26
See application file for complete search history.

(56) References Cited

U.S. PATENT DOCUMENTS

| 8,109,148 | B2 * | 2/2012 | Habibi | ................ G01L 19/0007 73/708 |
| 2007/0215219 | A1 | 9/2007 | Dewberry et al. | |
| 2009/0115245 | A1 * | 5/2009 | Attard | .................... B60T 13/565 303/114.3 |
| 2010/0154408 | A1 * | 6/2010 | Anderson | ............... B60T 7/042 60/556 |
| 2011/0120121 | A1 * | 5/2011 | Sprocq | .................. B60T 13/162 60/563 |

(Continued)

FOREIGN PATENT DOCUMENTS

| DE | 10030250 A1 | 8/2001 |
| DE | 102004033846 A1 | 2/2006 |

(Continued)

OTHER PUBLICATIONS

Oct. 14, 2015 French Preliminary Search Report issued in French Patent Application No. 1462777.

*Primary Examiner* — Peter MacChiarolo
*Assistant Examiner* — Alexander Mercado
(74) *Attorney, Agent, or Firm* — Oliff PLC

(57) ABSTRACT

A pressure measurement device has: a first chamber coupled to at least one fluid utilization unit, a second chamber coupled to a vacuum source, a seat with a passage for the fluid between the first and the second chamber, a plug for allowing or blocking the fluid flow through the passage, a retaining member for retaining the plug against the seat, a pressure sensor, and a measurement cavity coupled to the first chamber. The retaining member has a channel arranged to couple the first chamber and the measurement cavity.

16 Claims, 4 Drawing Sheets

(56) References Cited

U.S. PATENT DOCUMENTS

| | | | | |
|---|---|---|---|---|
| 2011/0120122 A1* | 5/2011 | Cagnac | ................... | B60T 7/042 |
| | | | | 60/579 |
| 2012/0023926 A1* | 2/2012 | Roach | ................... | B60T 13/145 |
| | | | | 60/547.1 |
| 2013/0192361 A1* | 8/2013 | Herderich | ............ | G01D 11/245 |
| | | | | 73/431 |
| 2014/0033824 A1* | 2/2014 | Habibi | ................. | G01L 9/0073 |
| | | | | 73/724 |
| 2015/0276132 A1 | 10/2015 | Roberge | | |

FOREIGN PATENT DOCUMENTS

| | | | |
|---|---|---|---|
| EP | 2199771 | A1 | 6/2010 |
| FR | 2909177 | A1 | 5/2008 |
| FR | 2936477 | A1 | 4/2010 |
| FR | 2996278 | A1 | 4/2014 |

\* cited by examiner

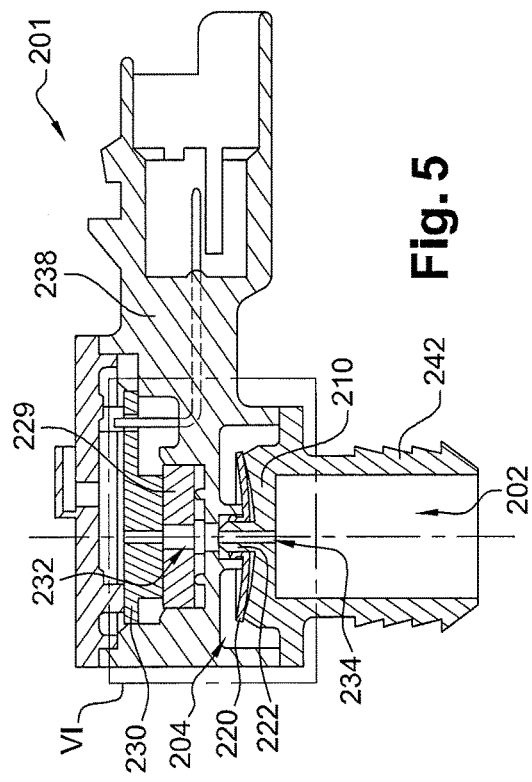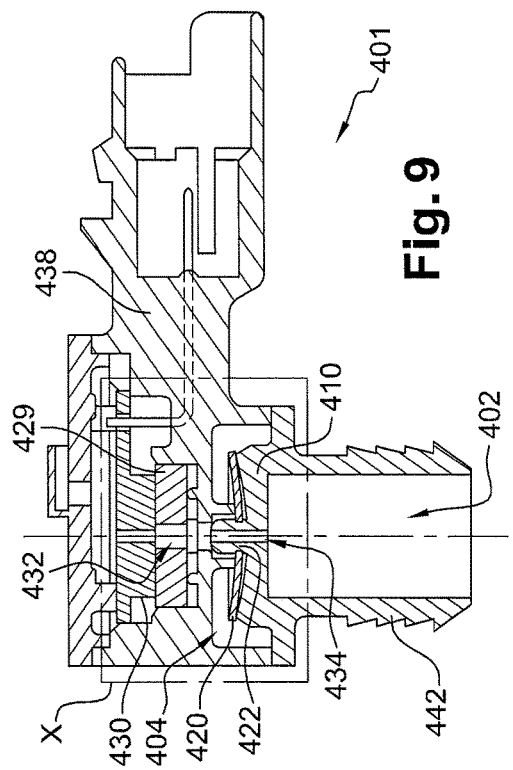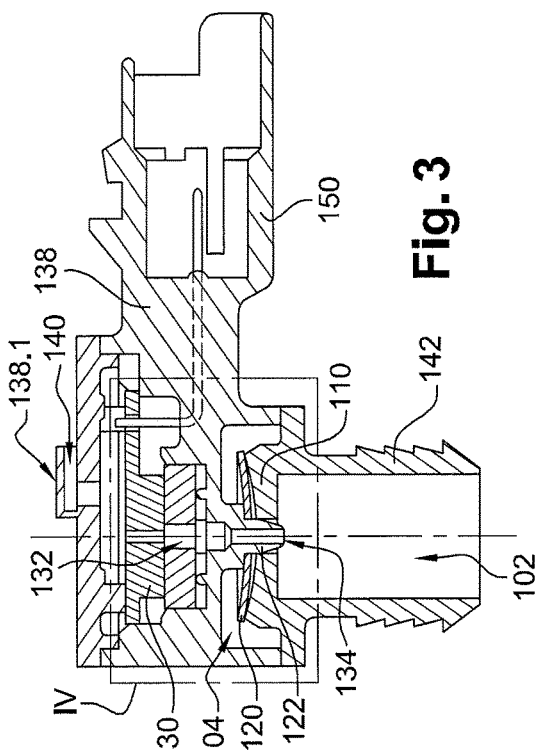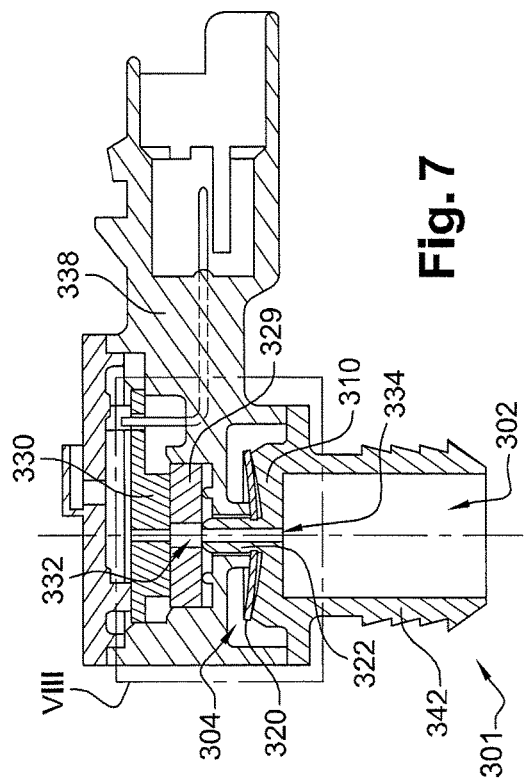

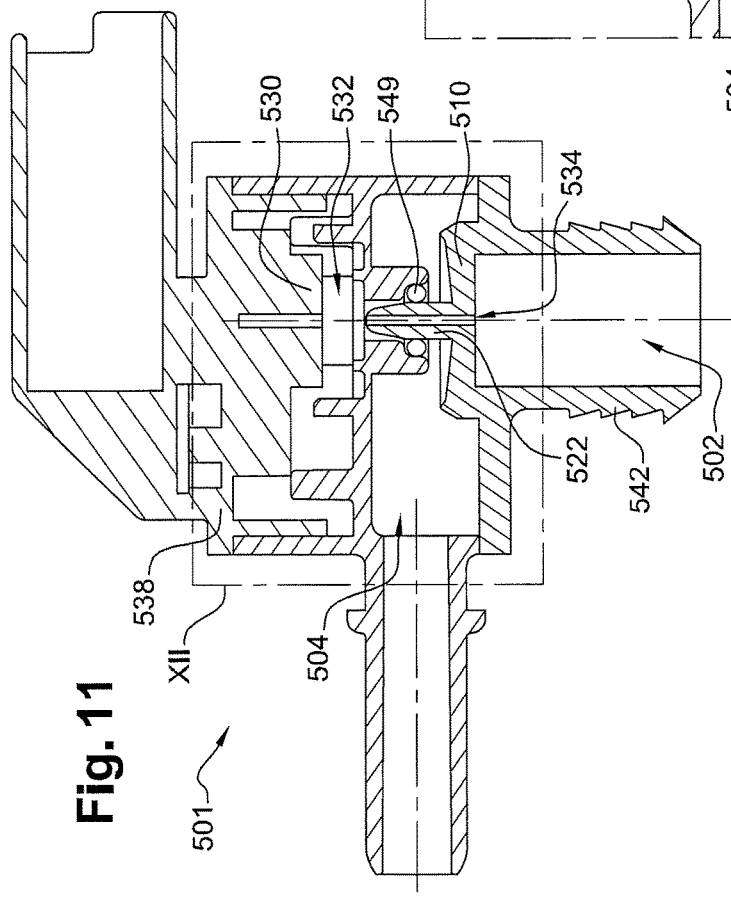
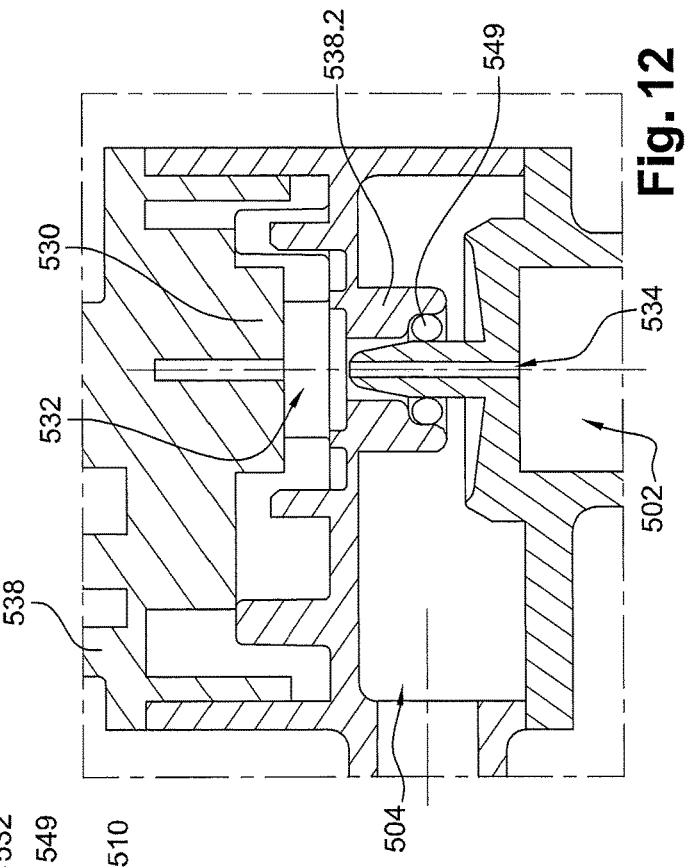
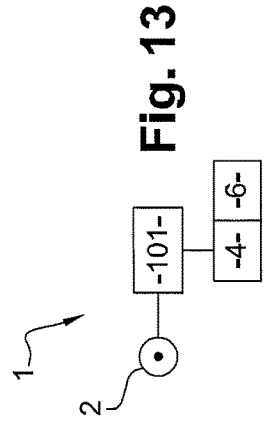

PRESSURE MEASUREMENT DEVICE AND BRAKING SYSTEM COMPRISING SUCH PRESSURE MEASUREMENT DEVICE

The present invention relates to a pressure measurement device for measuring pressures of a fluid flowing in a motor vehicle. Furthermore, the present invention relates to a braking system comprising such pressure measurement device.

The present invention applies to the field of the fluid pressure measurement in the motor vehicles. By motor vehicle, we mean, among others, the passenger vehicles, the commercial vehicles or the industrial vehicles for example of the motor truck type. For example, the present invention may apply to a braking system in which the pressure measurement device of the air pressures at the braking amplifier coupled to a vacuum source. According to another example, the present invention may apply to a recirculation valve of exhaust gases.

FR2909177A1 illustrates a pressure measurement device in a motor vehicle. This pressure measurement device has a first chamber coupled to a fluid utilization unit, a second chamber coupled to a vacuum source, as well as a seat with a fluid passage between the first and the second chambers. This pressure measurement device further has a plug to allow or to block the fluid flow through the passage, as well as a retaining member for retaining the plug against the seat. Furthermore, this pressure measurement device has a pressure sensor and a measurement cavity coupled to the first chamber.

However, in the pressure measurement device of FR2909177A1, the pressure sensor and the measurement cavity are arranged on the periphery of the first chamber, in order to allow measuring the pressure in the first chamber. The pressure sensor and the measurement cavity thus arranged have a significant radial or lateral footprint around the first chamber and/or the second chamber. But the radial size is often critical for dimensioning the braking system and the components surrounding it.

The present invention notably aims at resolving, all or part of the aforementioned problems, by providing a compact pressure measurement device, particularly on the periphery of the first chamber and the second chamber.

To this aim, the present invention relates to a pressure measurement device, for measuring pressures of a fluid flowing in a motor vehicle, the pressure measurement device having at least:
  a first chamber configured for the flow of the fluid, the first chamber being intended to be coupled to at least one fluid utilization unit,
  a second chamber configured for the flow of the fluid, the second chamber being intended to be coupled to a vacuum source,
  a seat having at least one passage arranged such that the fluid can flow between the first chamber and the second chamber,
  a plug configured to have i) an opening position, in which the plug is away from the seat such that the fluid can flow through the passage, and ii) a closing position in which the plug is pressed against the seat so as to block the fluid flow through the passage,
  a retaining member configured to retain the plug against the seat,
  a pressure sensor for transmitting signals representative of the fluid pressures, and
  a measurement cavity coupled to the first chamber, the pressure sensor being arranged to measure the pressure in the measurement cavity,
  the pressure measurement device being characterized in that the retaining member has at least one channel arranged to couple the first chamber and the measurement cavity.

Thus, such a pressure measurement device may have a reduced radial or lateral footprint, in particular around the first chamber and/or the second chamber.

In the present application, the term "couple" or one of its derivatives relates to a fluid, liquid or gas communication between at least two components, that is to say a communication allowing a fluid flow between these two components in one direction and/or in the opposite direction. A fluid communication may be carried out by means of no intermediate element, or by means of one or more intermediate element(s).

In the present application, the term "connect" means any connection allowing an exchange of signals. A connection may be carried out with or without electrical wire. A connection may be carried out with no intermediate element, one or more intermediate electrical element(s).

According to one embodiment of the invention, the pressure measurement device further comprises a support configured to delimit the measurement cavity.

Thus, such a support allows particularly the assembly of the components of the pressure measurement device.

According to a variant of the invention, the support is composed of plastic material, and the support is made by injection molding.

According to one embodiment of the invention, the retaining member is secured to the support, for example integral with the support.

Thus, such a secured arrangement allows manufacturing and assembling easily and quickly the retaining member and the support.

According to a variant of the invention, the pressure measurement device further comprises a coupling element configured to couple the pressure measurement device to a fluid conduit.

According to one embodiment of the invention, the retaining member is secured to the seat and/or the coupling element, for example integral with the seat and/or with the coupling element.

Thus, such a secured arrangement allows manufacturing and assembling easily and quickly the retaining member and the coupling element.

According to a variant of the invention, the coupling element is composed of plastic material, and the coupling element is made by injection molding. According to a variant of the invention, the coupling element includes a tip configured to couple a fluid conduit. For example, the tip may be an externally fir tree shaped tip. However, the tip may have other shapes.

According to a variant of the invention, the seat is formed by the coupling element. Thus, such an arrangement of the seat limits the number of components required for the assembly of the pressure measurement device.

According to a variant of the invention, the seat has several juxtaposed passages.

According to one embodiment of the invention, the retaining member forms a projection protruding from the plug.

Thus, such a projecting retaining member allows securely retaining the plug, because the plug may be fastened to an extended fastening surface.

According to a variant of the invention, the retaining member comprises a pin.

According to one embodiment of the invention, the channel has a cross section ranging from 0.03 mm² to 3.50 mm² and a length ranging from 2 mm to 20 mm.

Thus, such a cross section of the channel allows accurate pressure measurements, because the channel generates very low pressure losses.

According to a variant of the invention, the channel generally has the shape of a cylinder with a circular base whose diameter is ranging from 0.2 mm to 2.0 mm.

According to one embodiment of the invention, the measurement cavity has a cross section ranging from 1 mm² to 5 mm², preferably ranging from 2 mm² to 4 mm².

Thus, such a cross section of the measurement cavity allows accurate pressure measurements, because the measurement cavity generates very low pressure losses.

According to one embodiment of the invention, the plug has generally the shape of an annular crown having a central hole, the retaining member being fitted into the central hole.

Thus, such a shape of an annular crown allows retaining the plug on the entire periphery of the retaining member, which can produce a large retaining force.

The term "fitted" means that the retaining member is fastened on the plug not only in a mechanically resistant manner, but also in a fluid-tight manner.

According to a variant of the invention, the annular crown has a generally circle-shaped periphery. According to a variant of the invention, the central hole has generally the shape of a circle.

According to one embodiment of the invention, the pressure measurement device further comprises at least one seal arranged between the retaining member and the support, so as to form the sealing of the measurement cavity.

Thus, such a seal allows taking highly accurate pressure measurements, because it ensures the sealing of the measurement cavity.

According to one embodiment of the invention, the support has a tubular portion, and said at least one seal comprises an O-ring arranged between the tubular portion and the retaining member.

Thus, such a tubular portion provides a large sealing surface to cooperate with the seal, which ensures a very good sealing even at significant pressure drops.

According to a variant of the invention, the O-ring is partially housed in a groove defined in the tubular portion. Alternatively to this variant, the O-ring is partially housed in a groove defined in the retaining member.

Alternatively to the preceding embodiment, the seal is arranged so as to be compressed between the support and one end portion of the retaining member.

According to one embodiment of the invention, the plug is overmolded on the retaining member, and in which the seal is integral with the plug.

Thus, such a plug overmolded on the retaining member allows a long-lasting sealing and avoids errors during the assembly of these components of the pressure measurement device.

According to one embodiment of the invention, the pressure measurement device further comprises return means configured to return the plug to the closed position.

Thus, such return means allows the plug to return to the closed position quickly and reliably.

According to one embodiment of the invention, the plug is formed by an elastically deformable membrane, the elasticity of the elastically deformable membrane forming the return means.

Thus, such an elastically deformable membrane reduces the footprint of the pressure measurement device, because the elastically deformable membrane is often generally flat.

According to a variant of the invention, the elastically deformable membrane is composed of rubber and/or elastomer. According to a variant of the invention, the elastically deformable membrane is pre-stressed when it is in the closing position.

According to one embodiment of the invention, the support defines a conduit coupling the external surface of the support to a portion of the pressure sensor which is opposite to the measurement cavity.

Thus, such a conduit allows installing a relative pressure sensor, which reduces the cost of the pressure measurement device.

According to a variant of the invention, the pressure sensor may be configured to transmit signals representative of the relative fluid pressures.

Alternatively, the pressure sensor may be configured to transmit signals representative of the absolute pressures of the fluid. An absolute pressure sensor has a closed chamber which is evacuated and which serves as a reference for measuring the pressures. Alternatively, the pressure sensor may be configured to transmit signals representative of the relative fluid pressures. For example, the pressure sensor may have a reference chamber which is at the atmospheric pressure.

According to a variant of the invention, the pressure sensor may be configured to measure absolute pressures ranging from 50 mbarA to 1100 mbarA.

According to a variant of the invention, the pressure sensor comprises several piezoresistive pressure gauges and conductive paths connecting the piezoresistive pressure gauges, so as to form an electrical circuit for measuring pressure, for example a Wheatstone bridge.

According to a variant of the invention, the pressure measurement device further comprises an electrical connector for connecting a cable conveying the signals representative of the pressure measurements.

In addition, the present invention relates to a braking system, for a motor vehicle, the braking system comprising:
 at least one vacuum source,
 a braking force amplifier, and
 a pressure measurement device according to the invention, the pressure measurement device being arranged such that the first chamber is coupled to the braking force amplifier.

Thus, such a braking system is easy to integrate on a motor vehicle, because its pressure measurement device is compact.

According to a variant of the invention, the braking system may include a pressure accumulator, sometimes referred to as "vacuum vessel".

The aforementioned embodiments and variants may be taken individually or in any technically permissible combination.

This invention will be well understood and its advantages will also appear in the light of the description which will follow, given solely by way of a non-limiting example and performed with reference to the appended drawings, in which:

FIG. 3 is a schematic sectional view, along plane III of FIG. 2;

FIG. 5 is a view similar to FIG. 3 and illustrating a pressure measurement device according to a second embodiment of the invention;

FIG. 7 is a view similar to FIG. 3 and illustrating a pressure measurement device according to a third embodiment of the invention;

FIG. 9 is a view similar to FIG. 3 and showing a pressure measurement device according to a fourth embodiment of the invention;

FIG. 11 is a schematic view illustrating a braking system according to the invention and comprising a pressure measurement device according to the invention;

FIG. 12 is a view on a larger scale of detail XII in FIG. 11; and

FIG. 13 is a schematic view of a braking system according to the invention and comprising the pressure measurement device of FIGS. 1 to 4.

Figure 2:
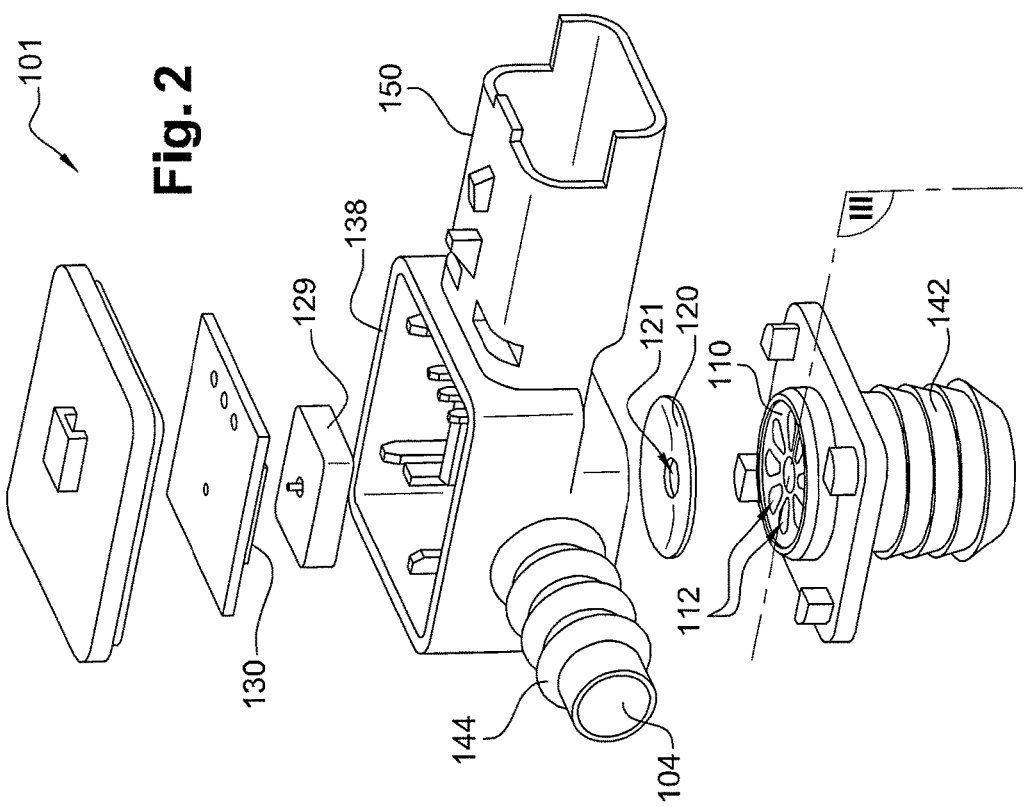
FIG. 2 is a schematic exploded perspective view, according to a different angle from FIG. 1, of the pressure measurement device of FIG. 1.

FIGS. 1, 2, 3 and 4 illustrate a pressure measurement device 101, which is operable to measure fluid pressures, in the case of the air, flowing in a braking system 1, visible in FIG. 13. The braking system 1 is mounted on a not-shown motor vehicle.

The pressure measurement device 101 has a first chamber 102 and a second chamber 104. The first chamber 102 and the second chamber 104 are configured for the air flow.

When the pressure measurement device 101 is in operation, the first chamber 102 is coupled to a fluid utilization unit. In the example of FIG. 13, the first chamber 102 is coupled to a braking amplifier 4.

When the pressure measurement device 101 is in operation, the second chamber 104 is coupled to a vacuum source 2, visible in FIG. 13. For example, the vacuum source may be i) a bypass conduit coupled to the air inlet (plenum) in the internal combustion engine of the motor vehicle or ii) a pump configured to generate a vacuum.

Furthermore, the pressure measurement device 101 has a seat 110 which has several passages 112. The passages 112 are arranged such that the fluid can flow between the first chamber 102 and the second chamber 104 when the passages 112 are not closed.

Figure 4:
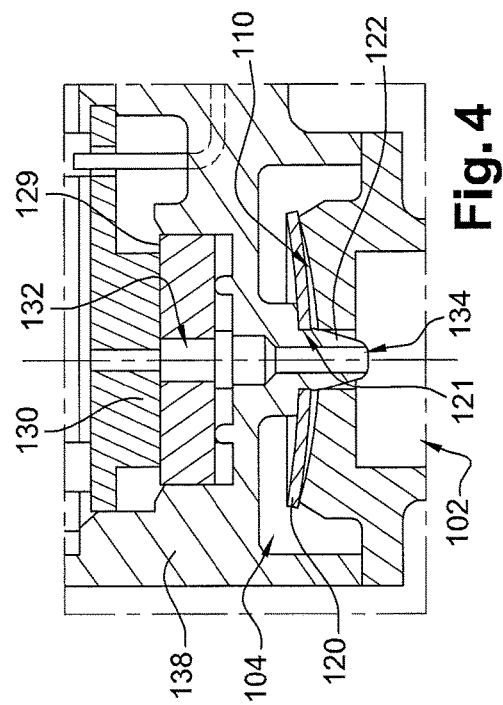
FIG. 4 is a view on a larger scale of detail IV in FIG. 3.

The pressure measurement device 101 further comprises a plug 120 which is configured to present i) a not-shown opening position and ii) a closing position (FIGS. 3 and 4). In the opening position, the plug 120 is away from the seat 110 such that the air can flow through the passage 112. In the closing position (FIGS. 3 and 4), the plug 120 is pressed against the seat 110, which blocks the air flow through the passage 112.

The plug 120 is particularly operable to maintain a low pressure (vacuum) in the first chamber 102 and until the utilization unit, which may be a braking amplifier. Indeed, the pressure in the second chamber 104 may significantly fluctuate, particularly due to fluctuations at the vacuum source.

Figure 1:
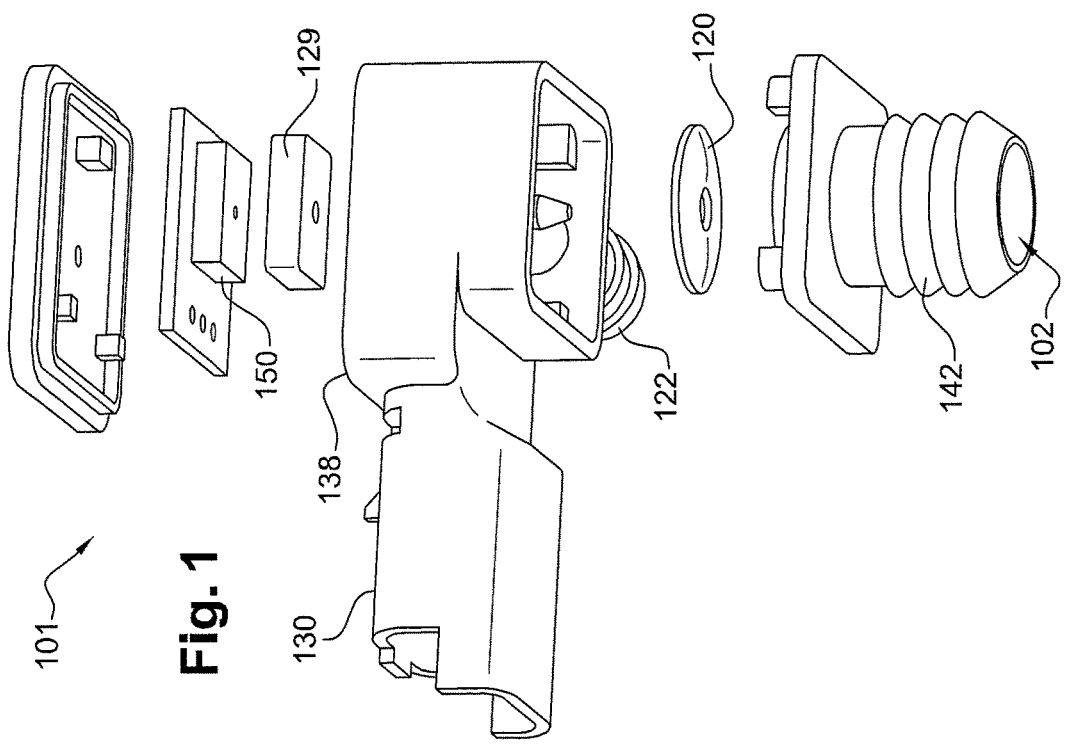
FIG. 1 is a schematic exploded perspective view of a pressure measurement device according to a first embodiment of the invention.

In the example of FIGS. 1 to 4, the plug 120 is formed by an elastically deformable membrane. The plug 120 has generally an annular crown shape having, on the one hand, i) a generally circular periphery and, on the other hand, ii) a generally circular central hole 121, as shown in FIGS. 1 and 2.

The elastically deformable membrane forming the plug 120 extends transversely to the passages 112. In operation, the elastically deformable membrane forming the plug 120 closes the passages 112 in the closed position and clears the passages 112 in the open position.

The pressure measurement device 101 also comprises a retaining member 122 configured to retain the plug 120 against the seat 110. The retaining member 122 comprises herein a pin and forms a projection protruding from the plug 120. In the assembled configuration (FIGS. 3 and 4), the retaining member 122 is fitted into the central hole 121 of the plug 120. The plug 120 is thus retained on the entire periphery of the retaining member 122.

The elastically deformable membrane forming the plug 120 is composed of rubber and/or elastomer. The elastically deformable membrane forming the plug 120 is pre-stressed when it is in the closing position. The elasticity of the elastically deformable membrane forms return means configured to return the plug 120 to the closed position.

In addition, the pressure measurement device 101 comprises a pressure sensor 130 for transmitting signals representative of the air pressures. The pressure measurement device 101 has a measurement cavity 132 which is coupled to the first chamber 102.

The pressure sensor 130 is arranged to measure the air pressure in the measurement cavity 132. The pressure sensor 130 is configured to transmit signals representative of the relative pressures of the air. The pressure sensor 130 is configured to measure absolute pressures ranging from 50 mbarA to 1100 mbarA.

The pressure sensor 130 comprises herein several piezoresistive pressure gauges and conductive paths connecting the piezoresistive pressure gauges, so as to form an electrical circuit for measuring pressure, for example a Wheatstone bridge.

The retaining member 122 has a channel 134 which is arranged to couple the first chamber 102 and the measurement cavity 132. The channel 134 has a cross section approximately equal to 2 mm$^2$ and a length approximately equal to 10 mm. The channel 134 has generally the shape of a cylinder with a circular base whose diameter is approximately equal to 1.5 mm.

The pressure measurement device 101 further comprises a body or support 138. The support 138 is herein composed of plastic material and is made by injection molding. The support 138 is configured to delimit the measurement cavity 132. The measurement cavity 132 has herein generally the shape of a cylinder whose diameter is approximately equal to 2 mm. The measurement cavity 132 has a cross section approximately equal to 3 mm$^2$.

The retaining member 122 is secured to the support 138. In this case, the retaining member 122 is integral with the support 138. The retaining member 122 and the support 138 are herein made by injection molding.

Furthermore, the support 138 defines a conduit 140 coupling the external surface 138.1 of the support 138 to a portion of the pressure sensor 130 which is opposite to the measurement cavity 132.

The pressure measurement device 101 further comprises a coupling element 142. The coupling element 142 is configured to couple the pressure measurement device 101 to an air conduit. The coupling element 142 forms herein the seat 110. The seat 110 has several juxtaposed passages 112. The coupling element 142 is composed of plastic material and is made by injection molding. The coupling element 142 includes a tip configured to couple an air conduit. The tip is herein externally fir tree shaped.

As shown in FIG. 2, the support 138 further comprises a coupling portion 144 configured to couple the pressure measurement device 101 to an air conduit, itself coupled to the vacuum source 2. The coupling portion 144 is herein externally fir tree shaped.

The pressure measurement device 101 further comprises a seal 129 arranged between the support 138 and the pressure sensor 130, so as to form the sealing of the measurement cavity 132. The seal 129 has herein a generally annular shape with a rectangular cross section. The seal 129 has a conduit opening onto two opposite faces so as to couple the measurement cavity 132 and the channel 134.

The pressure measurement device 101 further comprises an electrical connector 150 for connecting a not-shown cable conveying the signals representative of the pressure measurements.

Figure 6:
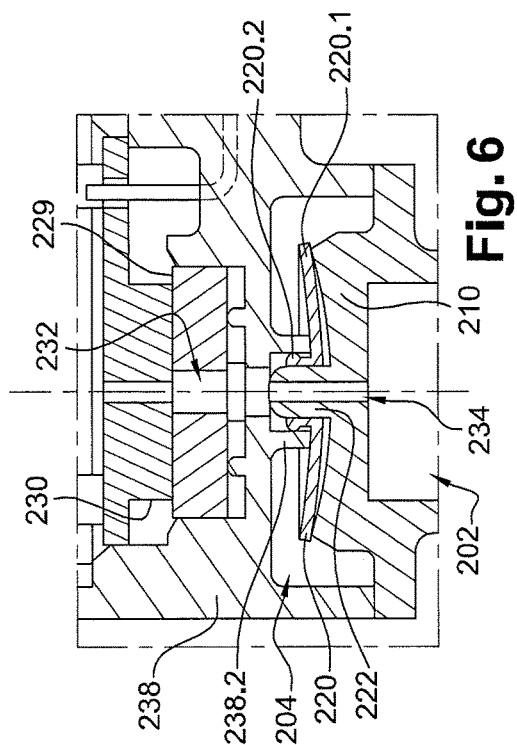
FIG. 6 is a view on a larger scale of detail VI in FIG. 5.

FIGS. 5 and 6 illustrate a pressure measurement device 201 according to a second embodiment of the invention. To the extent that the pressure measurement device 201 is similar to the pressure measurement device 101, the description of the pressure measurement device 101 given hereinabove relative to FIGS. 1 to 4 may be transposed to the pressure measurement device 201, with the noticeable exception of the differences stated hereinafter.

An element of the pressure measurement device 201 identical or corresponding, in its structure or in its function, to an element of the pressure measurement device 101 has the same numeral reference increased by 100. It is thus defined a first chamber 202, a second chamber 204, a seat 210, a plug 220, a retaining member 222, a pressure sensor 230, a measurement cavity 232, a channel 234 in the retaining member 222, a seal 229, a support 238 and a coupling element 242. The pressure measurement device 201 has not-shown passages through the seat 210.

The pressure measurement device 201 differs from the pressure measurement device 101, because the plug 220 is secured to the retaining member 222, while the plug 220 is separate from the retaining member 122 and attached to the retaining member 222. Thus, the plug 220 includes a portion forming a membrane 220.1 and a portion forming a seal 220.2.

Furthermore, the pressure measurement device 201 differs from the pressure measurement device 101, because the retaining member 222 is herein secured to the seat 210 and to the coupling element 242, while the retaining member 122 is secured to the support 138. In this case, the retaining member 122 is integral with the seat 210 and with the coupling element 142. The retaining member 122 and the coupling element 142 are herein made by injection molding.

Furthermore, the pressure measurement device 201 differs from the pressure measurement device 101, because the support 238 has a tubular portion 238.2 which is arranged around the retaining member 222. The tubular portion 238.2 is particularly operable i) to guide the retaining member 222 upon the assembly of the pressure measurement device 201, ii) to present one or more sealing surface(s) for the O-ring integrated with the membrane, and iii) to impose the suitable stress to the plug 220 to ensure the sealing in the closed position.

Figure 8:
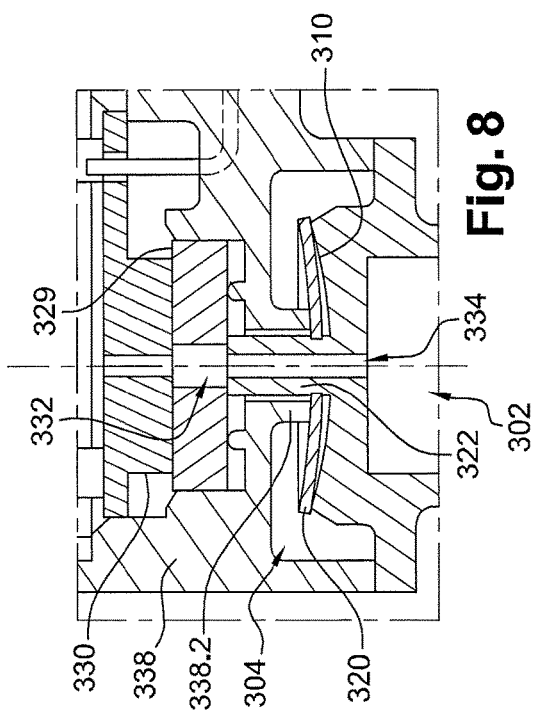
FIG. 8 is a view on a larger scale of detail VIII in FIG. 7.

FIGS. 7 and 8 illustrate a pressure measurement device 301 according to a third embodiment of the invention. To the extent that the pressure measurement device 301 is similar to the pressure measurement device 201, the description of the pressure measurement device 201 given hereinabove relative to FIGS. 5 and 6 may be transposed to the pressure measurement device 301, with the noticeable exception of the differences stated hereinafter.

An element of the pressure measurement device 301 identical or corresponding, in its structure or in its function, to an element of the pressure measurement device 201 has the same numeral reference increased by 100. It is thus defined a first chamber 302, a second chamber 304, a seat 310, a plug 320, a retaining member 322, a pressure sensor 330, a measurement cavity 332 a channel 334 in the retaining member 322, a seal 329, a support 338 with a tubular portion 338.2 and a coupling element 342. The pressure measurement device 301 has not-shown passages through the seat 310.

The pressure measurement device 301 differs from the pressure measurement device 201, because the pressure measurement device 301 comprises a single seal 329 which is configured to be axially compressed, while the pressure measurement device 201 comprises the seal 229 besides the sealing portion 220.2 of the plug 220. The single seal 329 allows reducing the number of components to be assembled. To compress the seal 329, the retaining member 322 is longer than the retaining member 222.

The pressure measurement device 301 further differs from the pressure measurement device 201, because the tubular portion 338.2 is only operable i) to guide the retaining member 322 and ii) to manage the stress on the plug 320, while the tubular portion 238.2 is also operable for sealing.

Figure 10:
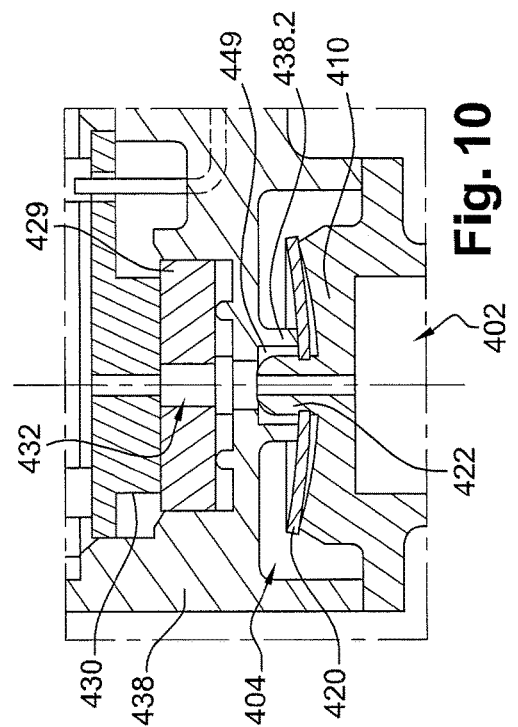
FIG. 10 is a view on a larger scale of detail X in FIG. 9.

FIGS. 9 and 10 illustrate a pressure measurement device 401 according to a fourth embodiment of the invention. To the extent that the pressure measurement device 401 is similar to the pressure measurement device 301, the description of the pressure measurement device 301 given hereinabove relative to FIGS. 7 and 8 may be transposed to the pressure measurement device 401 with the noticeable exception of the differences stated hereinafter.

An element of the pressure measurement device 401 identical or corresponding, in its structure or in its function, to an element of the pressure measurement device 301 has the same numeral reference increased by 100. It is thus defined a first chamber 402, a second chamber 404, a seat 410, a plug 420, a retaining member 422, a pressure sensor 430, a measurement cavity 432, a channel 434 in the retaining member 422, a seal 429, a support 438 with a tubular portion 438.2 and a coupling element 442. The pressure measurement device 401 has not-shown passages through the seat 410.

The pressure measurement device 401 differs from the pressure measurement device 301, because the pressure measurement device 401 comprises a secondary seal 449 which is radially and axially compressed. The secondary seal 449 is compressed between the tubular portion 438.2 and the retaining member 422.

FIGS. 11 and 12 illustrate a pressure measurement device 501 according to a fifth embodiment of the invention. To the extent that the pressure measurement device 501 is similar to the pressure measurement device 401, the description of the pressure measurement device 401 given hereinabove relative to FIGS. 9 and 10 may be transposed to the pressure measurement device 501, with the noticeable exception of the differences stated hereinafter.

An element of the pressure measurement device 501 identical or corresponding, in its structure or in its function, to an element of the pressure measurement device 401 has the same numeral reference increased by 100. It is thus defined a first chamber 502, a second chamber 504, a seat 510, a retaining member 522, a pressure sensor 530, a measurement cavity 532, a channel 534 in the retaining member 522, a support 538 with a tubular portion 538.2, and a coupling element 542. The pressure measurement device 501 has a not-shown plug and not-shown passages through the seat 510.

The pressure measurement device 501 differs from the pressure measurement device 401, because the pressure measurement device 501 comprises an O-ring 549 arranged between the tubular portion 538.2 and the retaining member 522. Furthermore, in the example of FIGS. 11 and 12, the O-ring 549 is partially housed in a groove defined in the tubular portion 538.2.

FIG. 13 illustrates schematically the braking system 1. The braking system 1 comprises a vacuum source 2, a braking force amplifier 4, a pressure accumulator 6 and the pressure measurement device 101. The pressure measurement device 101 is arranged such that the first chamber 102 is coupled to the braking force amplifier 4.

Of course, the present invention is not limited to the particular embodiments described in the present patent application, nor to the embodiments within the capabilities of those skilled in the art. Other embodiments may be envisaged without departing from the scope of the invention, from any element equivalent to an element described in the present patent application.

The invention claimed is:

1. A pressure measurement device, for measuring pressures of a fluid flowing in a motor vehicle, the pressure measurement device comprising:
    a first chamber configured for the flow of the fluid, the first chamber being configured to be coupled to at least one fluid utilization unit,
    a second chamber configured for the flow of the fluid, the second chamber being configured to be coupled to a vacuum source,
    a seat having at least one passage arranged such that the fluid can flow between the first chamber and the second chamber,
    a plug configured to have i) an opening position, in which the plug is away from the seat such that the fluid can flow through the passage, and ii) a closing position, in which the plug is pressed against the seat so as to block the fluid flow through the passage,
    a retaining member configured to retain the plug against the seat,
    a pressure sensor for transmitting signals representative of the pressures of the fluid, and
    a measurement cavity coupled to the first chamber, the pressure sensor being arranged to measure the pressure in the measurement cavity,
    the pressure measurement device being configured such that the retaining member comprises at least one channel configured to fluidly couple the first chamber and the measurement cavity, the channel being arranged through the retaining member.

2. The pressure measurement device according to claim 1, further comprising a support configured to delimit the measurement cavity.

3. The pressure measurement device according to claim 2, wherein the retaining member is secured to the support.

4. The pressure measurement device according to claim 1, wherein the retaining member is secured to the seat and/or to a coupling element, and/or with the coupling element.

5. The pressure measurement device according to claim 1, wherein the retaining member forms a projection protruding from the plug.

6. The pressure measurement device according to claim 1, wherein the channel has a cross section ranging from 0.03 mm$^2$ to 3.50 mm$^2$ and a length ranging from 2 mm to 20 mm.

7. The pressure measurement device according to claim 1, wherein the measurement cavity has a cross section ranging from 1 mm$^2$ to 5 mm$^2$.

8. The pressure measurement device according to claim 1, wherein the plug has the shape of an annular crown having a central hole, the retaining member being fitted into the central hole.

9. The pressure measurement device according to claim 2, further comprising at least one seal arranged between the retaining member and the support, so as to form a sealing of the measurement cavity.

10. The pressure measurement device according to claim 9, wherein the support has a tubular portion, and wherein said at least one seal comprises an O-ring arranged between the tubular portion and the retaining member.

11. The pressure measurement device according to claim 9, wherein the plug is overmolded on the retaining member, and wherein the seal is integral with the plug.

12. The pressure measurement device according to claim 1, further comprising a return member configured to return the plug to the closed position.

13. The pressure measurement device according to claim 12, wherein the plug is formed by an elastically deformable membrane.

14. The pressure measurement device according to claim 2, wherein the support defines a conduit coupling an external surface of the support to a portion of the pressure sensor which is opposite to the measurement cavity.

15. A braking system for a motor vehicle, the braking system comprising:
    at least one vacuum source,
    a braking force amplifier, and
    the pressure measurement device according to claim 1, the pressure measurement device being arranged such that the first chamber is coupled to the braking force amplifier.

16. The pressure measurement device according to claim 1, wherein the second chamber is arranged between the first chamber and the measurement cavity.

* * * * *